US007142778B2

(12) United States Patent
Montgomery

(10) Patent No.: US 7,142,778 B2
(45) Date of Patent: Nov. 28, 2006

(54) OPTICAL ENCODING OF AUDIO DATA

(75) Inventor: Dennis L. Montgomery, Reno, NV (US)

(73) Assignee: Etreppid Technologies, LLC., Reno, NV (US)

( * ) Notice: Subject to any disclaimer, the term of this patent is extended or adjusted under 35 U.S.C. 154(b) by 1101 days.

(21) Appl. No.: 10/033,537

(22) Filed: Oct. 31, 2001

(65) Prior Publication Data

US 2003/0081146 A1 May 1, 2003

(51) Int. Cl.
*H04N 7/06* (2006.01)

(52) U.S. Cl. ........................................ 386/96; 386/104

(58) Field of Classification Search .................. 386/96, 386/104, 105, 106, 102, 39, 54; *H04N 7/06*
See application file for complete search history.

(56) References Cited

U.S. PATENT DOCUMENTS 5,191,319 A 3/1993 Kiltz .......................... 340/701
6,411,289 B1 * 6/2002 Zimmerman ............. 715/500.1
6,507,742 B1 * 1/2003 Lin et al. .................... 455/446

FOREIGN PATENT DOCUMENTS

EP 0 675 478 10/1995

OTHER PUBLICATIONS

Fushikida et al., "Visualized Sound Retrieval and Categorization Using a Feature-Based Image Search Engine," *IEICE Trans. Inf. & Syst.* (2000) E83-D:1978-1985.

* cited by examiner

*Primary Examiner*—Robert Chevalier
(74) *Attorney, Agent, or Firm*—Pillsbury Winthrop Shaw Pittman LLP

(57) ABSTRACT

A method for representing audio data in a format that can be merged with video data, where the audio data includes a sequence of audio information elements. The method includes replacing each audio information element in the sequence with a unique corresponding color from a color palette.

3 Claims, 3 Drawing Sheets

OPTICAL ENCODING OF AUDIO DATA

FIELD OF THE INVENTION

The present invention relates to encoding data and more particularly to manipulating audio data so that it can be encoded along with video data.

DESCRIPTION OF THE RELATED ART

Typically a movie includes a sequence of video frames together with a corresponding sequence of audio frames (i.e., a video track and an audio track). Synchronization of these frames on playback is crucial for an audience's appreciation of the movie. However, these sequences are generally processed separately because of characteristic differences between video and audio data. Compression is an example of a processing step that is performed separately for video and audio data.

The nature of video data requires that compression be performed separately. Video data is typically a frame corresponding to a two-dimensional display. For example, a DVD (Digital Video Disk) typically employs a 720×480 array of pixels where each pixel contains a multi-bit value, such as 16-bit, 24-bit or 32-bit, that corresponds to an enumerated color.

Audio data on the other hand, is typically time-varying waveform data that represents a voltage or current rather than color. The data can be 16-bit values or higher bit values that correspond to the voltage or current that will drive a speaker.

Because of these characteristic differences, separate encoders and decoders are used for video and audio data. Having two separate encoders and decoders is an inefficient use of resources and costly. Further, synchronization between the separate encoders and decoders may not be maintained. It would, therefore, be desirable to use one encoder and decoder for both video and audio data. The present invention provides a mechanism for allowing audio data to be manipulated so that it can be concurrently encoded and decoded with video data.

SUMMARY OF THE INVENTION

A method for representing audio data in a format that can be operated upon independently, or merged with video data. The method includes replacing each audio information element in an audio sequence with a corresponding color from a color palette.

BRIEF DESCRIPTION OF THE DRAWINGS

The present invention is illustrated by way of example, and not limitation, in the figures of the accompanying drawings in which like references denote similar elements, and in which.

DETAILED DESCRIPTION OF THE PREFERRED EMBODIMENTS OF THE INVENTION

Methods and apparatus for manipulating audio data so that it may be encoded and decoded along with video data are described. In the following description, for purposes of explanation, numerous specific details are set forth in order to provide a thorough understanding of the present invention. It will be evident, however, to one skilled in the art that the present invention may be practiced with a variety of data, especially audio and video, without these specific details. In other instances, well-known operations, steps, functions and elements are not shown in order to avoid obscuring the invention.

Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 1A:
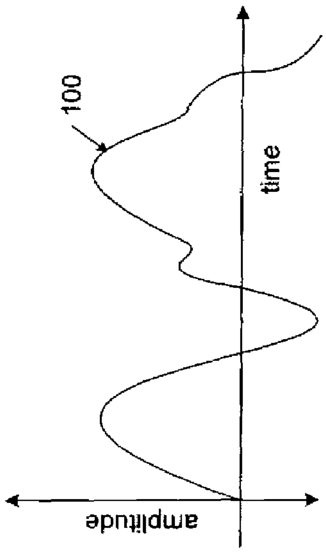
FIG. 1*a* illustrates a representative audio signal.

FIG. 1*a* illustrates a representative audio signal. Before an audio signal can be digitally encoded and transmitted it needs to be transformed into a digital signal, although implementation of the present invention will typically occur on audio signals that have previously been transformed into digital signals. To transform audio signal 100 into a digital signal, audio signal 100 is typically sampled by an analog to digital converter at a predetermined rate to produce snapshots of the value of the audio signal at equally spaced intervals, as is conventionally known. Depending on the audio scheme being implemented a certain number of samples make up a frame. Typically, samples are encoded or processed using frames.

Figure 1B:
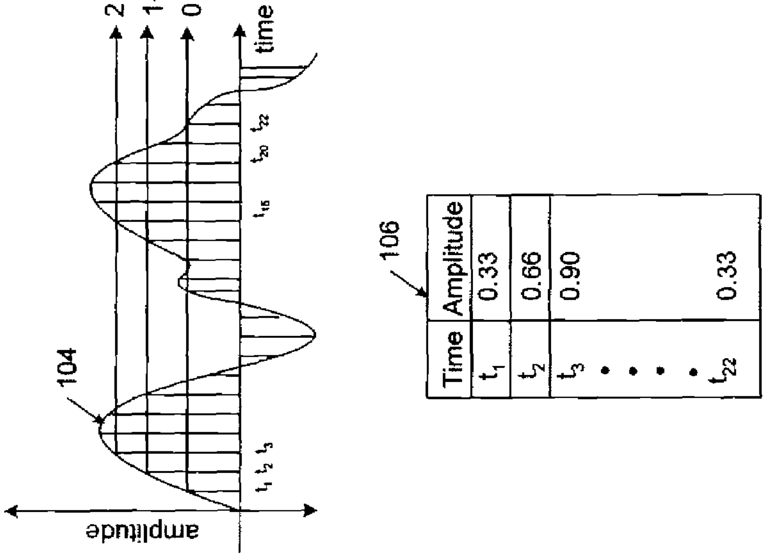
FIG. 1*b* illustrates a representative digitally sampled audio signal.

FIG. 1*b* illustrates a representative digitally sampled audio signal. Digitally sampled audio signal 104 is a sequence of digital values, also termed digital audio signal elements, that are spaced apart by the same time interval. The sequence of digital audio signal elements can be represented in a two column table in which each row contains the time a sample was taken and the digital value of the sampled audio signal at the sample time. Table 106 shows such a table or data.

Since audio and video data have different formats, audio data is not conventionally appended to video data and encoded with it. The present invention provides a mechanism for manipulating audio data so that it can be appended to video data for later encoding concurrently with the video data.

Figure 2:
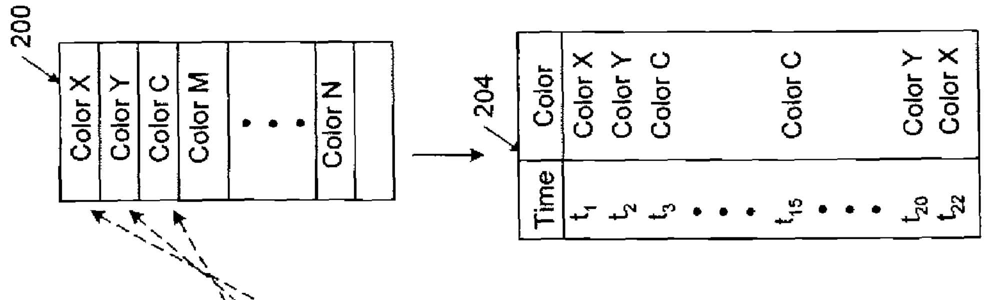
FIG. 2 illustrates graphically a digitally sampled audio signal being mapped to colors selected from a palette of possible colors.

FIG. 2 illustrates graphically a digitally sampled audio signal being mapped to colors selected from a palette of possible colors. Audio data from various points in time, each audio signal element in other words, is tracked in time based upon a header (not shown) that indicates the playback rate, which then allows playback of the sequence of digital audio signal elements at the appropriate time. All of the digital audio signal elements that occur at different points in time that have the same amplitude have the same color assigned to them. The process of mapping assigns a color to the corresponding digital audio signal element at each different point in time, as shown at 204. After the process of mapping, each of the digital audio signal elements, instead of having an associated amplitude, has an associated color obtained from a color lookup table. Audio signals that have the same amplitudes will thus have the same color. For example, $t_1$, $t_7$, and $t_{22}$ all have the same color assigned to them from the palette 200. Similarly, $t_2$ and $t_{20}$ have the same pointer, 1, assigned to them. The color assigned to a particular amplitude is thus a function of the amplitude. Palette 200 is a sub-palette of the palette of possible colors.

Figure 3:
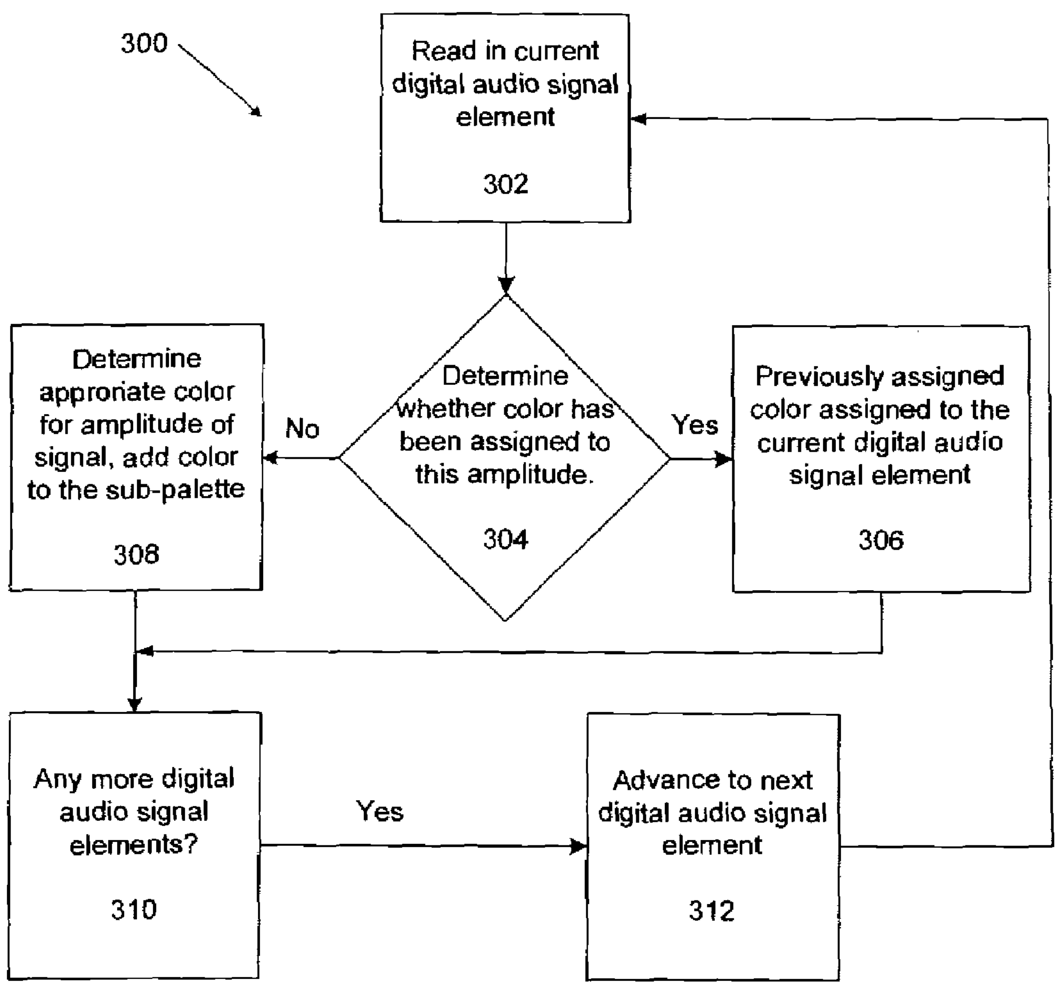
FIG. 3 illustrates a process for mapping a digitally sampled audio signal to colors selected from a palette of possible colors.

FIG. 3 illustrates a process for mapping a digital audio signal element to a color selected from a palette of possible colors. According to process 300, the amplitude for a digital audio signal element is read in at 302. At 304, it is determined whether a color has been previously assigned to the amplitude. If a color has been previously assigned to the amplitude, the previously assigned color lookup for the color is assigned to the current element sample at 306. If a color has not been previously assigned to the amplitude, a new color lookup is assigned to both the color and amplitude and the color is added to a sub-palette at 308. The sub-palette is the set of colors that have been assigned to the amplitudes of the digitally sampled audio signal elements. At 310, it is determined whether there are any more digital audio signal elements to process. If there are more digital audio signal elements to process, process 300 advances to the next sample at 312 and the amplitude for the current sample is read in at 302. At the end of process 300, the sub-palette contains all the colors that were needed to describe the amplitudes at all the times of the digitally sampled audio signal elements. Also for each sample in the frame, instead of an amplitude there is an associated color from the sub-palette. The output of process 300 are a frame that contains the sub-palette and the sequence digital audio signals in their transformed color format.

The color audio frame of process 300 is added to a corresponding video frame to produce an augmented video frame that can be encoded and later decoded. In order to not obscure the present invention, methods and apparatus of adding the color audio frame to a corresponding video frame, and then operating upon the augmented frame will not be described in greater detail. Conventional methods, as well as methods described in co-pending applications entitled "Method And Apparatus For Determining Patterns Within Adjacent Blocks Of Data bearing attorney reference number 042503/0259665 and filed on the same day as this application in the U.S. Patent Office, and U.S. application Ser. No. 09/727,096 entitled "Method And Apparatus For Encoding Information Using Multiple Passes And Decoding In A Single Pass" filed on Nov. 29, 2000, both of which are assigned to the same assignee as the present invention, can be used for adding the color audio frame to the video frame to obtain the augmented frame and then operating upon the augmented frame, although it will be understood that the present invention can be used independently and without reference to a video frame.

Figure 4:
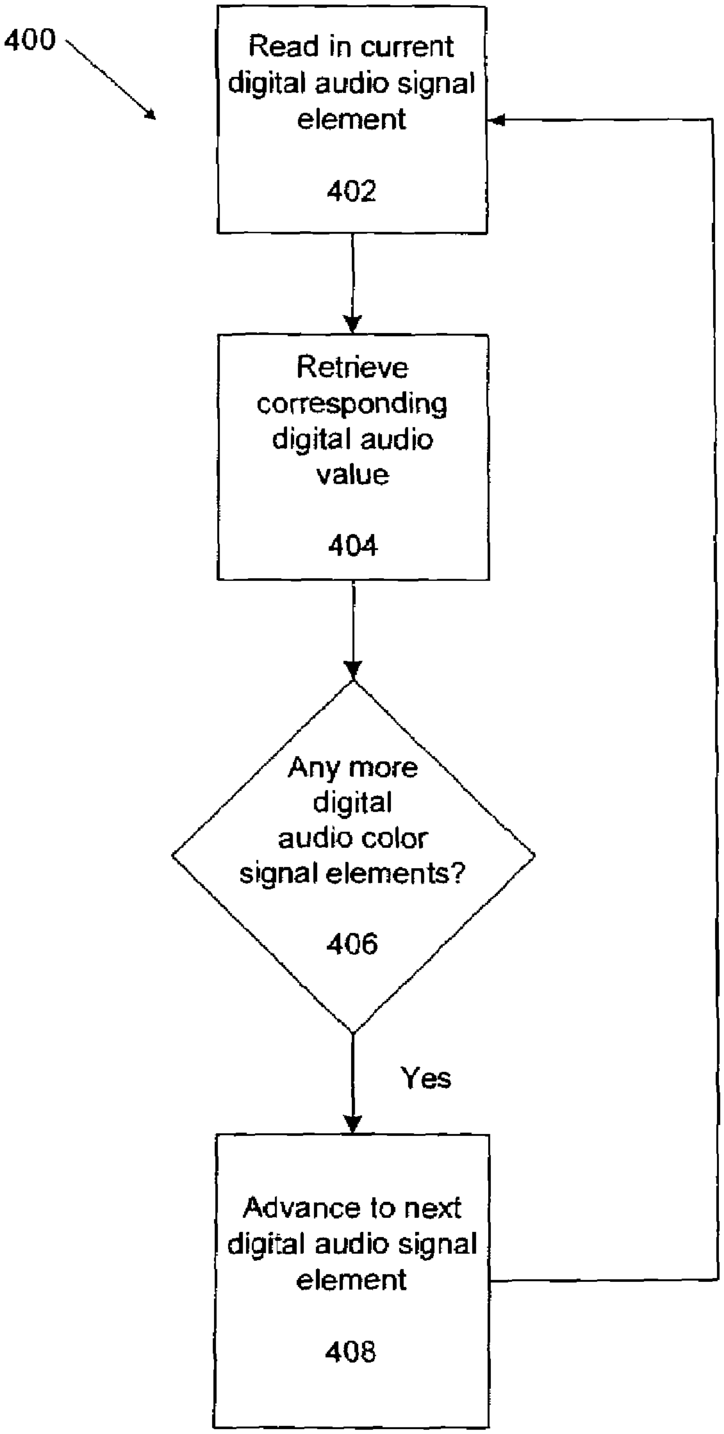
FIG. 4 illustrates a process for recovering the audio frame from the color audio frame.

After the augmented video frame is decoded, the color audio can be separated from the augmented video frame and the digital audio signal elements recovered. FIG. 4 illustrates a process for recovering the digital audio signal elements. According to process 400, the digital color value for the current digital audio signal element is read in at 402 and the corresponding digital audio value is retrieved based upon the color lookup at 404. At 406, it is determined whether there are any more digital color values representing the digital audio signal elements to process. If there are more values to process, at 408 the process advances to the next sample and the amplitude for the now current sample is read in at 402. The output of process 400 are the original digitally sampled audio signals.

Thus, methods and apparatus for manipulating audio data so that it may be encoded independently in a different form, and, more preferably, along with video data have been described. Although the present invention has been described with reference to specific exemplary embodiments, it will be evident to one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for representing audio data in a format that can be merged with video data, wherein the audio data includes a sequence of digital audio information elements, the method comprising:

replacing each digital audio information element in the sequence with a corresponding digital color representation from a color palette.

2. The method according to claim 1, wherein the step of replacing includes the steps of:

determining whether a digital color representation has been previously assigned to each digital audio information element;

in the event no digital color representation has been previously assigned to one of the digital audio information elements, assigning a new digital color representation to the one digital audio information element;

placing the new digital color representation in a digital color palette; and replacing the one digital audio information element with the new digital color representation from the digital color palette; and in the event another digital color representation was been previously assigned to another digital audio information element corresponding to the one digital audio information element, replacing the one digital audio information element with the previously assigned another digital color representation from the digital color palette.

3. The method according to claim 2, further including the steps of:

sequentially retrieving each digital color representation corresponding to each digital audio information element;

translating each digital color representation into the corresponding digital audio information element; and outputting each corresponding digital audio information element in a playback sequence.

* * * * *